(12) United States Patent
Nakamura

(10) Patent No.: US 11,102,360 B2
(45) Date of Patent: Aug. 24, 2021

(54) INFORMATION PROCESSING APPARATUS CONFIGURED TO CREATE IMAGE DATA WITH DIFFERENT SIZES, AND NON-TRANSITORY COMPUTER-READABLE MEDIUM STORING INSTRUCTIONS THEREFOR

(71) Applicant: Brother Kogyo Kabushiki Kaisha, Nagoya (JP)

(72) Inventor: Kenichi Nakamura, Anjo (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/835,711

(22) Filed: Mar. 31, 2020

(65) Prior Publication Data
US 2020/0228670 A1 Jul. 16, 2020

Related U.S. Application Data

(63) Continuation of application No. 16/021,118, filed on Jun. 28, 2018, now Pat. No. 10,911,616.

(30) Foreign Application Priority Data

Aug. 29, 2017 (JP) .............................. JP2017-164223

(51) Int. Cl.
*H04N 1/387* (2006.01)
*H04N 1/00* (2006.01)
*G06F 3/12* (2006.01)

(52) U.S. Cl.
CPC ....... *H04N 1/00334* (2013.01); *G06F 3/1202* (2013.01); *H04N 1/00167* (2013.01); *H04N 1/00225* (2013.01); *H04N 1/00708* (2013.01)

(58) Field of Classification Search
CPC ........... H04N 1/00334; H04N 1/00456; H04N 1/00167; H04N 1/00708; G06F 3/1208
USPC ........................ 358/1.18, 1.15; 715/246, 252
See application file for complete search history.

(56) References Cited

U.S. PATENT DOCUMENTS

| 2006/0120791 | A1‡ | 6/2006 | Nagae | B41J 3/4075 400/611 |
|---|---|---|---|---|
| 2006/0197984 | A1‡ | 9/2006 | Komatsu | B41J 3/4075 358/1.18 |
| 2007/0086055 | A1* | 4/2007 | Ishibashi | G06F 40/103 358/1.18 |

(Continued)

Primary Examiner — Jemares Q Washington
(74) Attorney, Agent, or Firm — Banner & Witcoff, Ltd.

(57) ABSTRACT

A controller of an information processing apparatus is configured to receive image data representing a first size image, the first size being a size within which a first number of first objects can be printed, extract second image data included in the first image data, the second image data representing the first object, create first print data used to print the second number of first objects on the second size sheet in an arranged manner based on the extracted second image data, the second number being less than the first number, the first size being a size of a sheet on which the first number of first objects can be arranged, the second size being a size of a sheet on which the first number of first objects cannot be arranged but the second number of first objects can be arranged, the first print data being transmitted to a printer.

12 Claims, 11 Drawing Sheets

(56) References Cited

U.S. PATENT DOCUMENTS

| | | | | |
|---|---|---|---|---|
| 2008/0079997 | A1‡ | 4/2008 | Kawano | ................. G03G 15/36 358/1.15 |
| 2010/0302565 | A1‡ | 12/2010 | Tanaka | ................. G06F 3/1208 358/1.9 |
| 2012/0120445 | A1‡ | 5/2012 | Kuroshima | ............ G06F 3/1205 358/1.15 |
| 2012/0243049 | A1‡ | 9/2012 | Takayama | ............ B41J 11/0065 358/1.18 |
| 2012/0281255 | A1‡ | 11/2012 | Fukuda | ................. H04N 1/387 358/1.18 |

\* cited by examiner
‡ imported from a related application

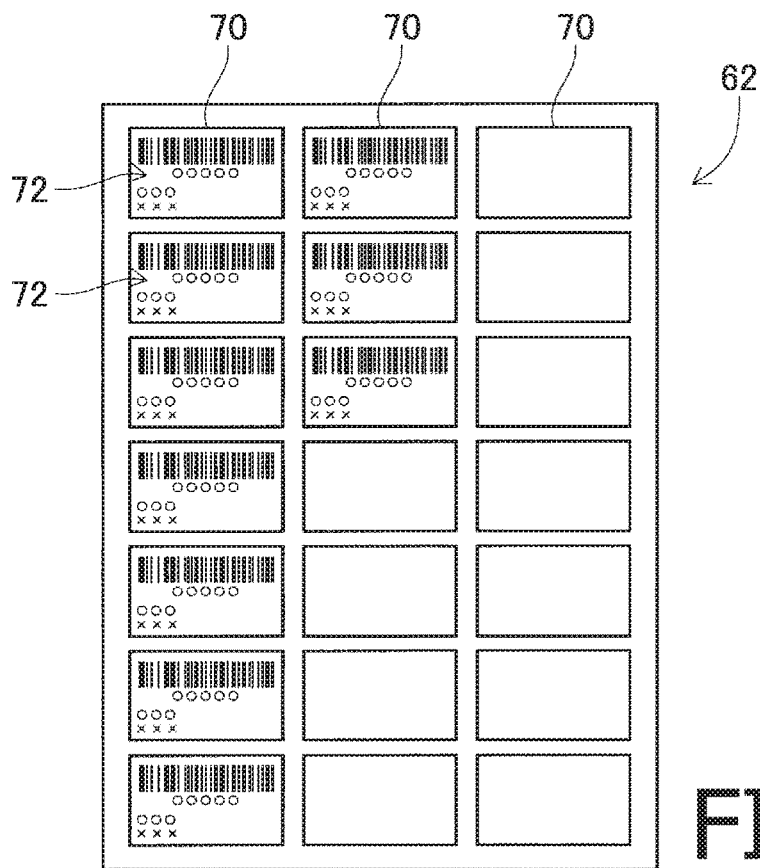
FIG. 5A
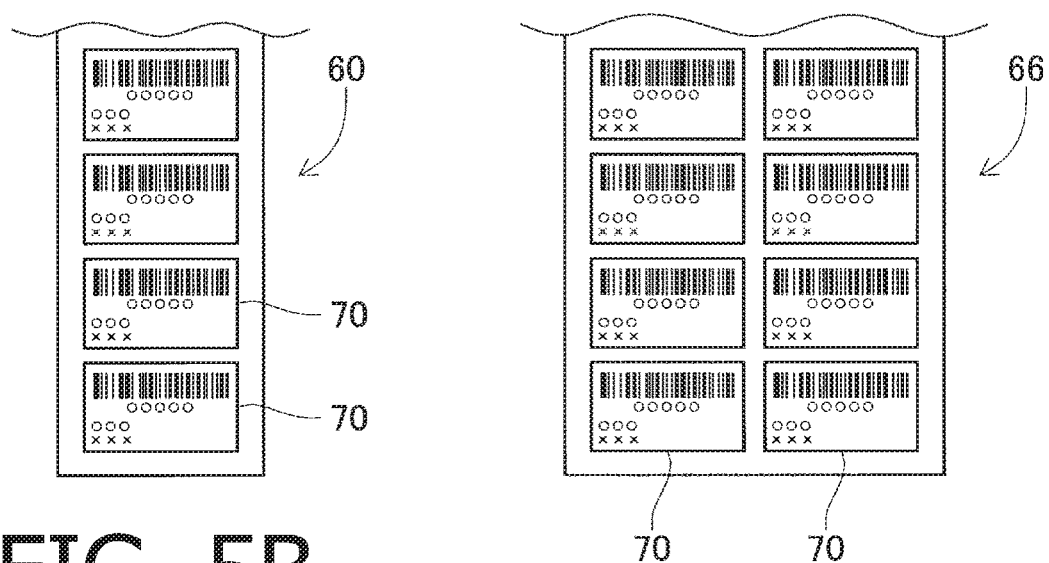
FIG. 5B
FIG. 5C

INFORMATION PROCESSING APPARATUS CONFIGURED TO CREATE IMAGE DATA WITH DIFFERENT SIZES, AND NON-TRANSITORY COMPUTER-READABLE MEDIUM STORING INSTRUCTIONS THEREFOR

CROSS-REFERENCE TO RELATED APPLICATIONS

This application is a continuation of U.S. patent application Ser. No. 16/021,118 filed Jun. 28, 2018 which claims priority under 35 U.S.C. § 119 from Japanese Patent Application No. 2017-164223 filed on Aug. 29, 2017. The entire subject matter of the application is incorporated herein by reference.

BACKGROUND

Technical Field

The present disclosures relate to a non-transitory computer-readable medium storing instructions realizing a printer driver with which an object such as a barcode can be printed on a printing sheet. The present disclosures also relate to an information processing apparatus employing the printer driver.

Related Art

There has been known a technique for printing objects such as barcodes on a label sheet on which a plurality of labels (e.g. item labels) are arranged in a matrix.

SUMMARY

According to a conventional art, it is possible to print objects on the label sheet. It is noted, however, that if the number of labels arranged on one label sheet is relatively large, the objects may not be printed on all the labels of the label sheet, and the unprinted labels will be wasted. Therefore, it is preferable that the number of unprinted labels in such a label sheet is reduced.

According to aspects of the present disclosures, there is provided a non-transitory computer-readable medium for an information processing apparatus having a communication interface and a controller. The non-transitory computer readable medium storing instructions realizes a printer driver, which causes, when executed, the controller to receive image data representing the first size image from an application via an operating system, an operating system being installed in the information processing apparatus, the controller being configured to read an application capable of outputting an image data representing a first size image which is a size of a printing sheet on which a first number of first objects can be printed, extract second image data included in the first image data which is the first sized image data received from the application, the second image data being image data representing the first object, create first print data used to print the second number of first objects on the second size sheet in an arranged manner based on the extracted second image data, the second number being less than the first number, the first size being a size of a sheet on which the first number of first objects can be arranged, the second size being a size of a sheet on which the first number of first objects cannot be arranged but the second number of first objects can be arranged, and transmit the first print data as created to a printer through the communication interface, the communication interface being configured to communicate with the printer.

According to aspects of the present disclosures, there is provided an information processing apparatus having a communication interface and a controller, The non-transitory computer readable medium storing instructions realizes a printer driver, which causes, when executed, the controller to receive image data representing a first size image from an application via an operating system, the operating system being installed in the information processing apparatus, the controller being configured to read an application capable of outputting an image data representing a first size image which is a size of a printing sheet on which first objects arranged in M columns can be printed, extract second image data included in the first image data which is the first sized image data received from the application, the second image data being image data representing the first object, create first print data used to print the second number of first objects on the second size sheet in an arranged manner based on the extracted second image data, the second number being less than the first number, the first size being a size of a sheet on which the first number of first objects can be arranged, the second size being a size of a sheet on which the first number of first objects cannot be arranged but the second number of first objects can be arranged, and transmit the first print data as created to the printer through the communication interface, the communication interface being configured to communicate with a printer.

According to aspects of the present disclosures, there is provided an information processing apparatus having a communication interface and a controller, the controller being configured to receive image data representing a first size image from the application, the first size being a size within which a first number of first objects can be printed, extract second image data included in the first image data which is the first sized image data received from the application, the second image data being image data representing the first object, create first print data used to print the second number of first objects on the second size sheet in an arranged manner based on the extracted second image data, the second number being less than the first number, the first size being a size of a sheet on which the first number of first objects can be arranged, the second size being a size of a sheet on which the first number of first objects cannot be arranged but the second number of first objects can be arranged, and transmit the first print data as created to a printer through the communication interface, the communication interface being configured to communicate with the printer.

According to aspects of the present disclosures, there is provided an information processing apparatus having a communication interface and a controller, the controller is configured to receive image data representing a first size image from the application, the first size being a size within which first objects arranged in M columns can be printed, extract second image data included in the first image data which is the first sized image data received from the application, the second image data being image data representing the first object, create first print data used to print first objects on the second size sheet arranged in N columns based on the extracted second image data, the N columns being less than the M columns, the first size being a size of a sheet within which the first objects can be arranged in M columns, the second size being a size of a sheet within which the first objects cannot be arranged in M columns but can be arranged in N columns, and transmit the first print data as created to the printer through the communication interface, the communication interface being configured to communicate with a printer.

BRIEF DESCRIPTION OF THE ACCOMPANYING DRAWINGS

FIGS. 5A-5C respectively show various types of label sheets.

Figure 6:
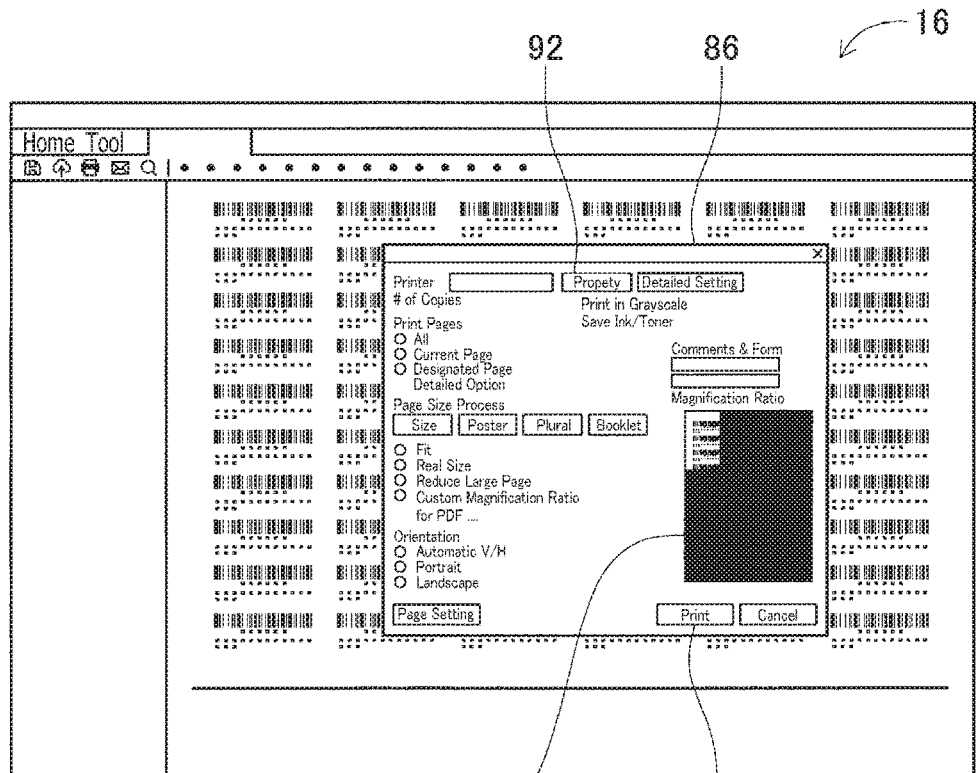

FIG. 6 shows an application-compliant setting screen.

Figure 7:
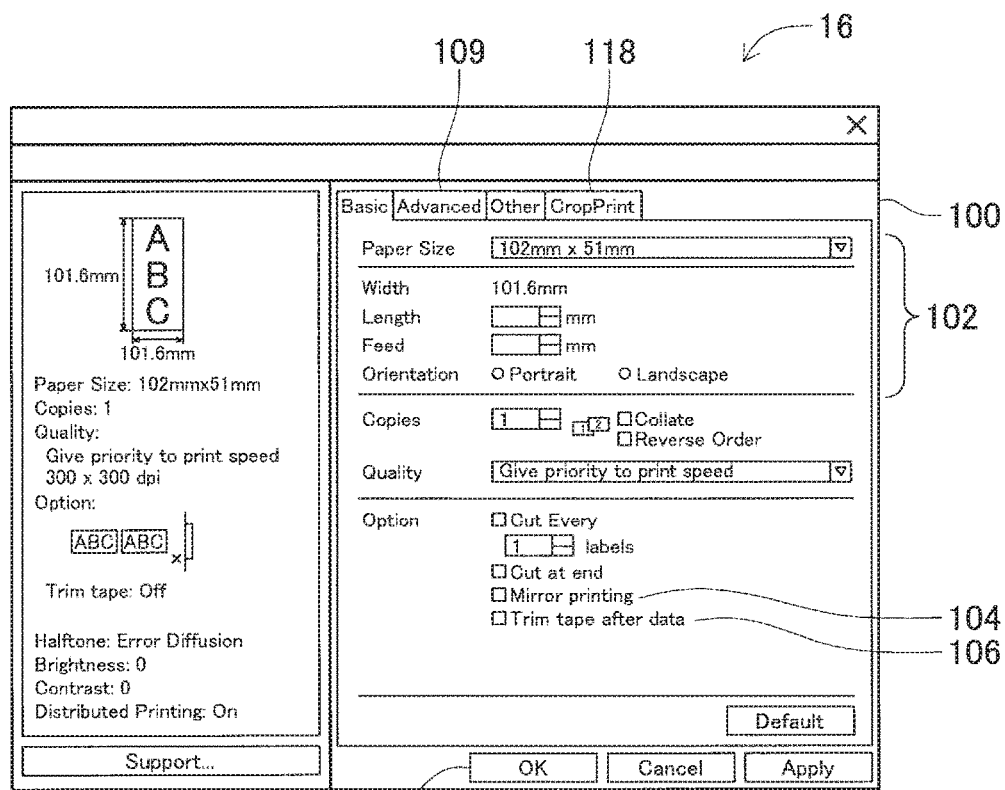

FIG. 7 shows a driver-compliant first setting screen.

Figure 8:
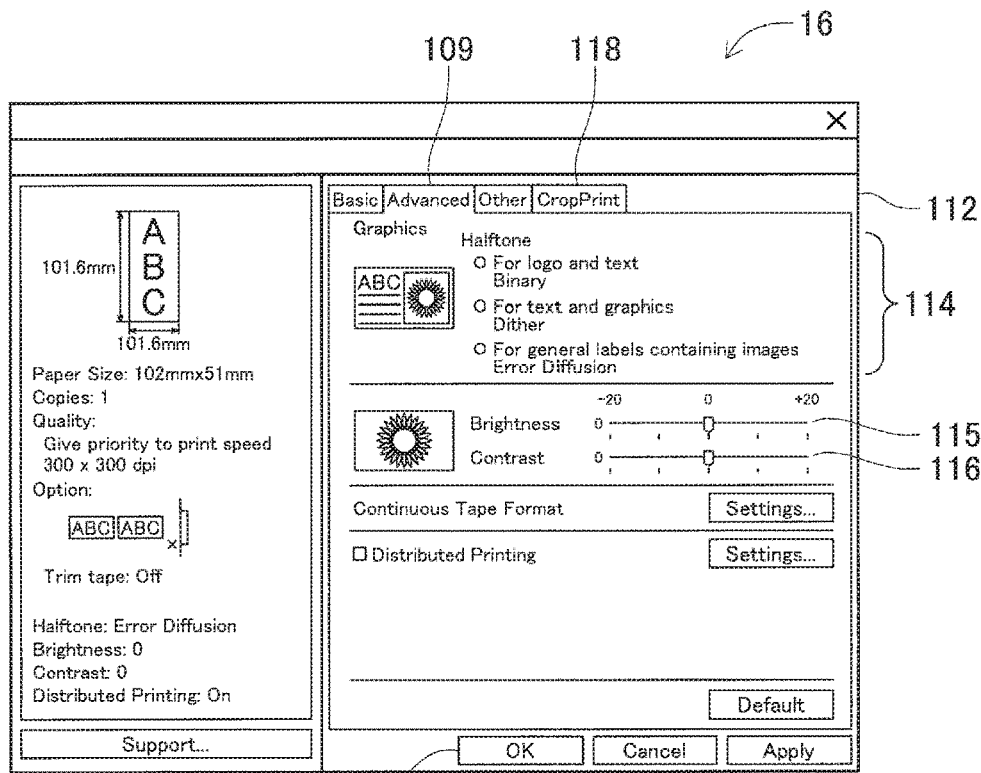

FIG. 8 shows a driver-compliant second setting screen.

Figure 9:
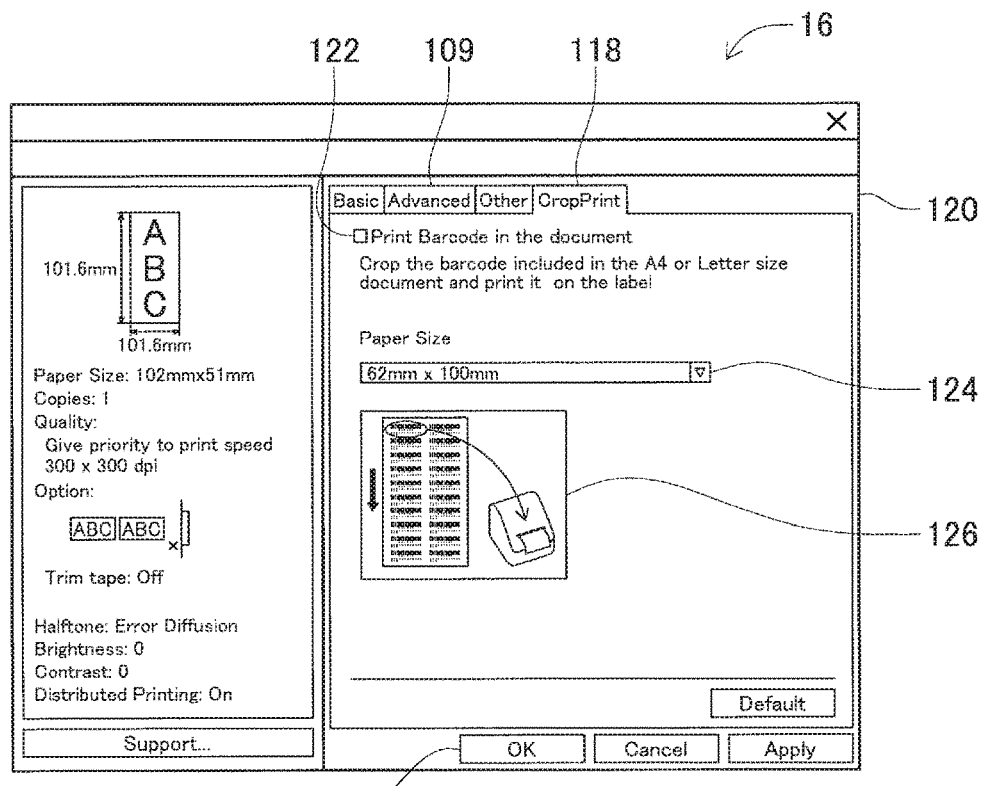

FIG. 9 shows a driver-compliant third setting screen.

Figure 10A:
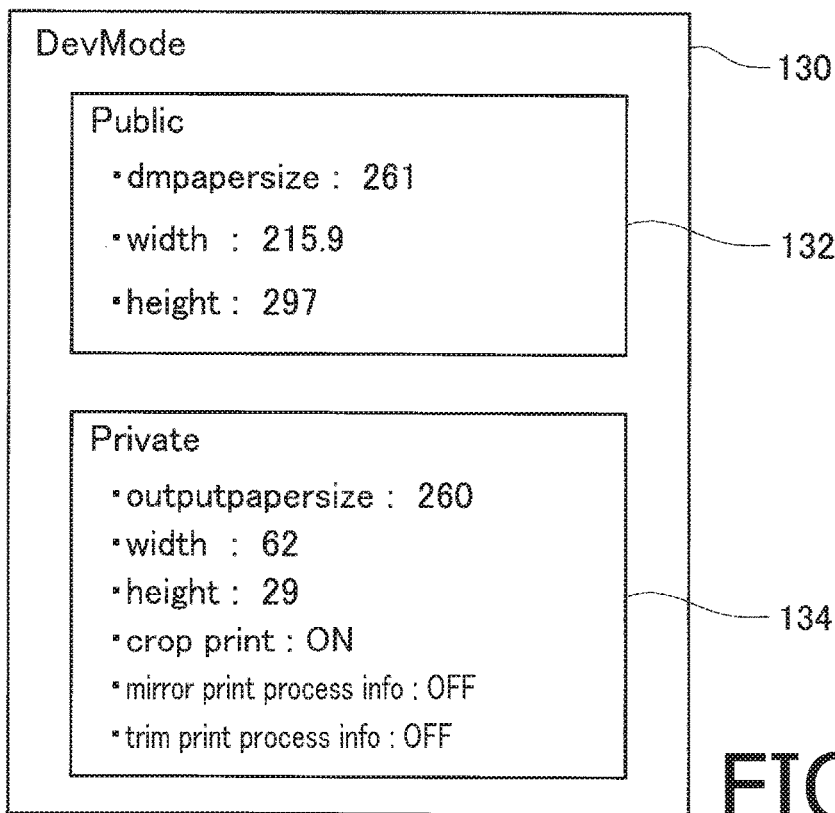
Figure 10B:
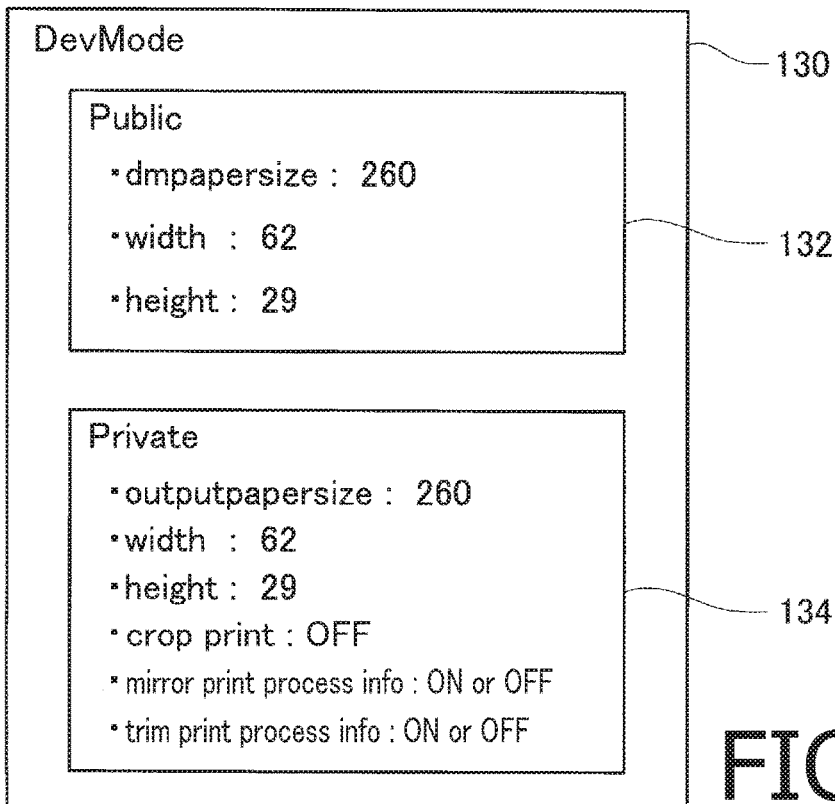

FIGS. 10A and 10B show examples of "DevMode" structures.

Figure 11:
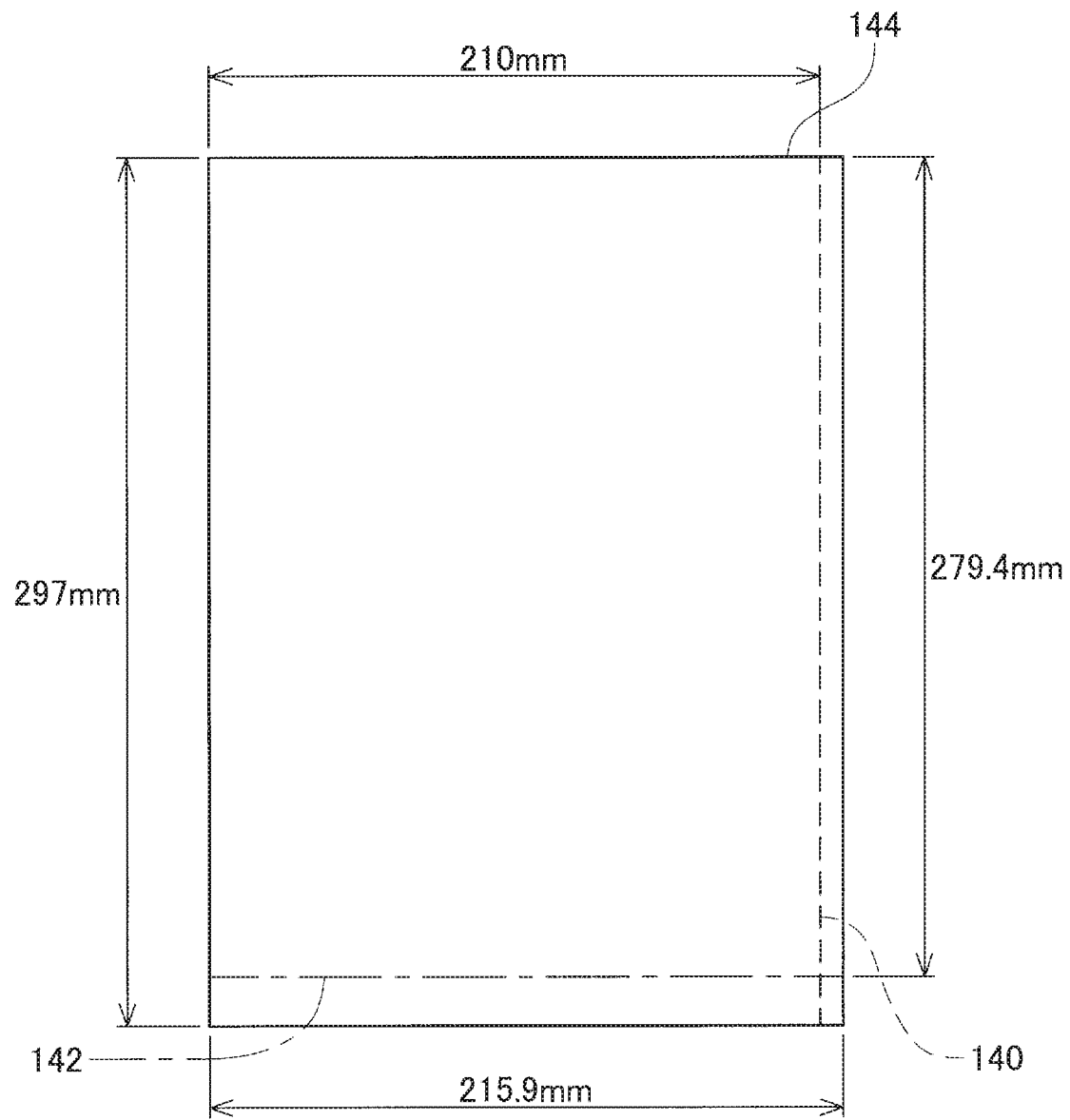

FIG. 11 schematically shows an A4-Letter size.

Figure 12:
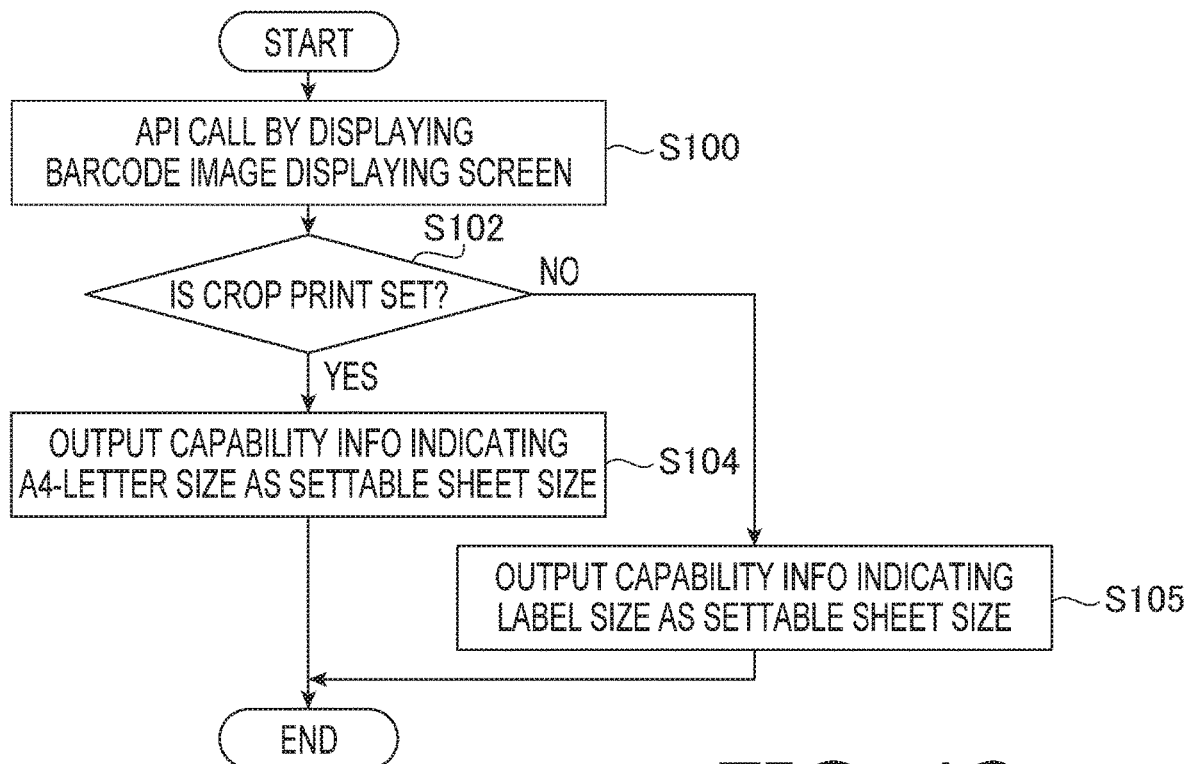

FIG. 12 is a flowchart illustrating a process of a printer driver.

Figure 13:
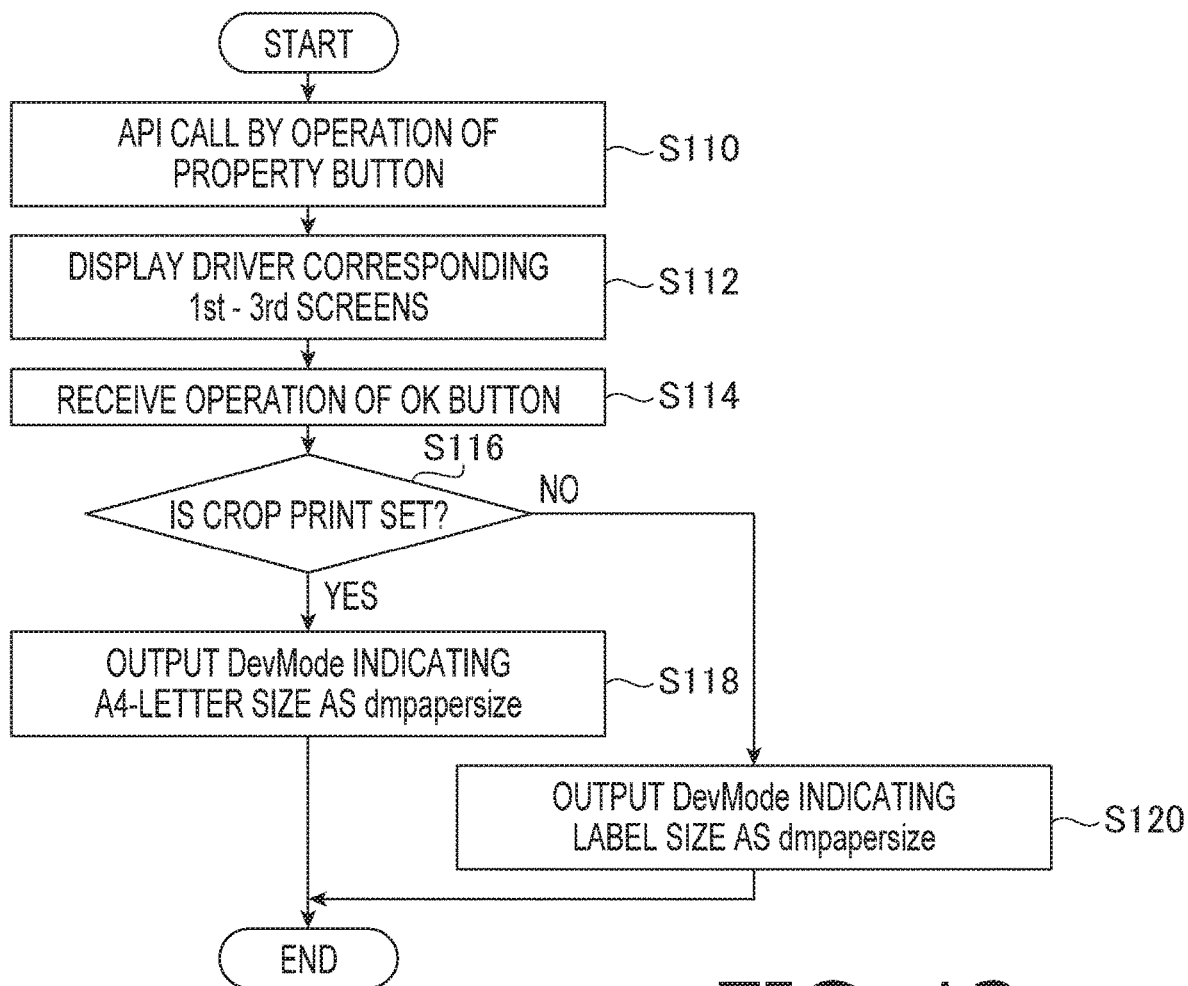

FIG. 13 is a flowchart illustrating a process of the printer driver.

Figure 14:
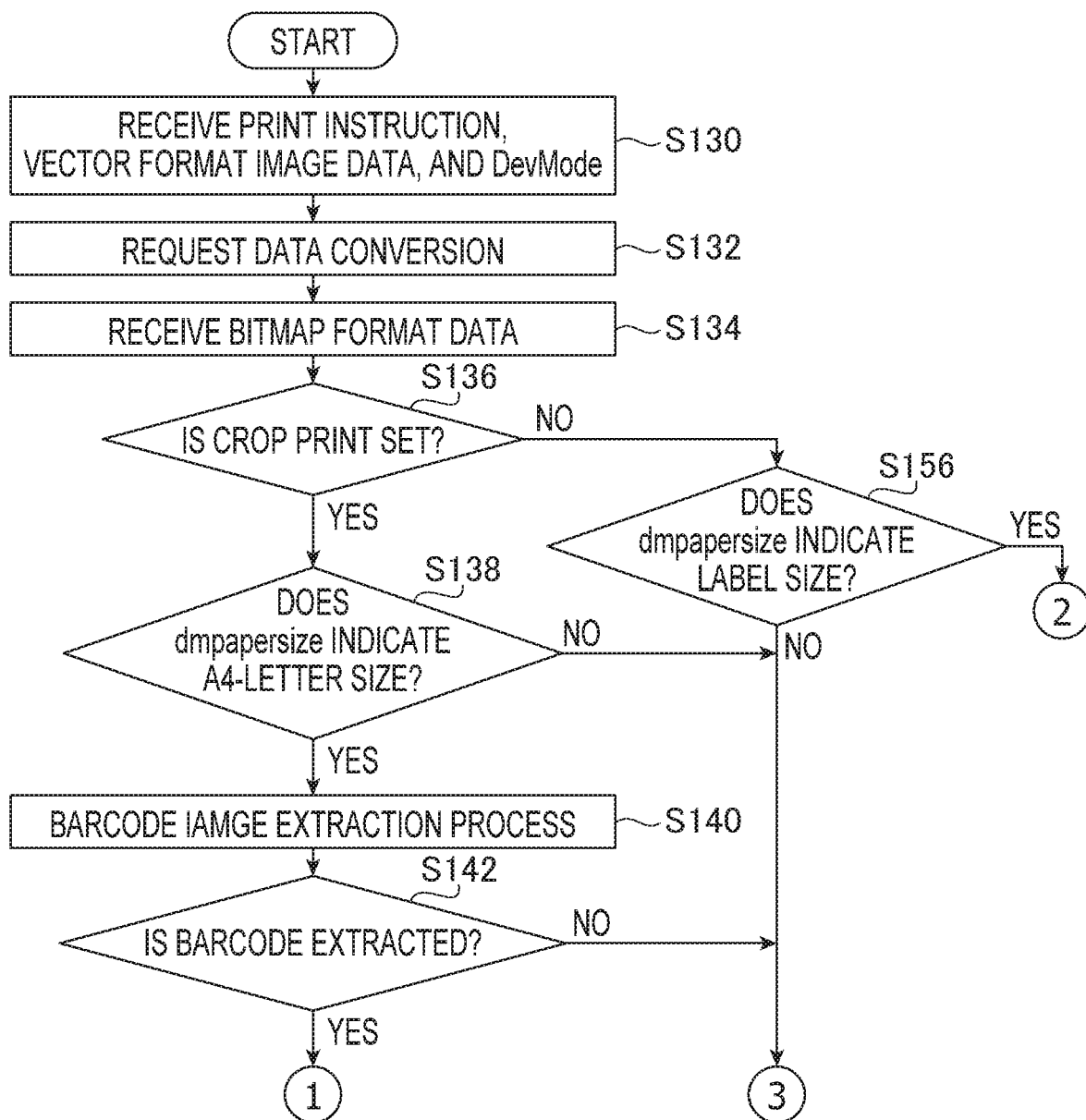
Figure 15:
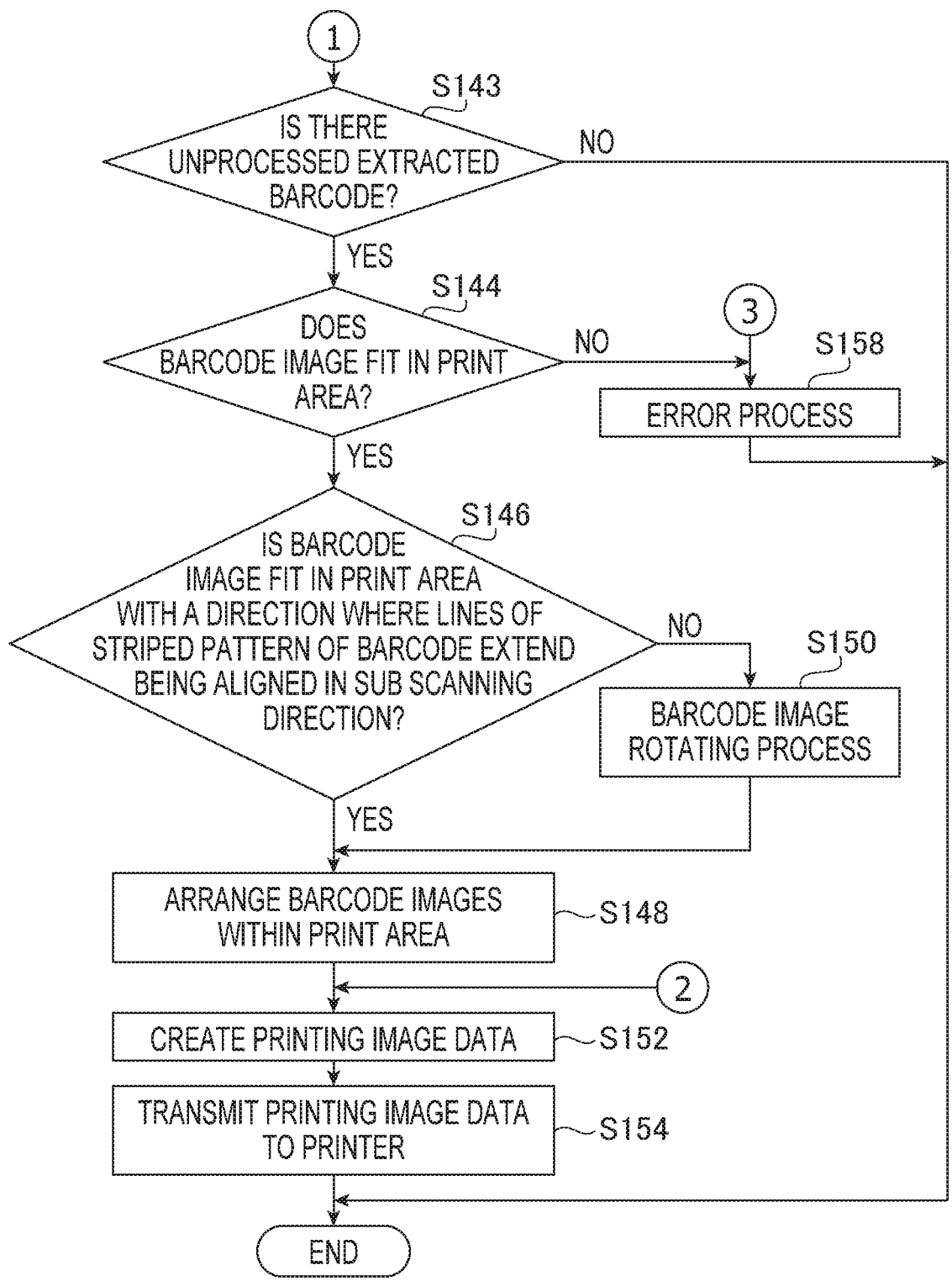

FIGS. 14 and 15 show a flowchart illustrating a process of the printer driver.

DETAILED DESCRIPTION OF THE EMBODIMENTS

<Configuration of Communication System>

Figure 1:
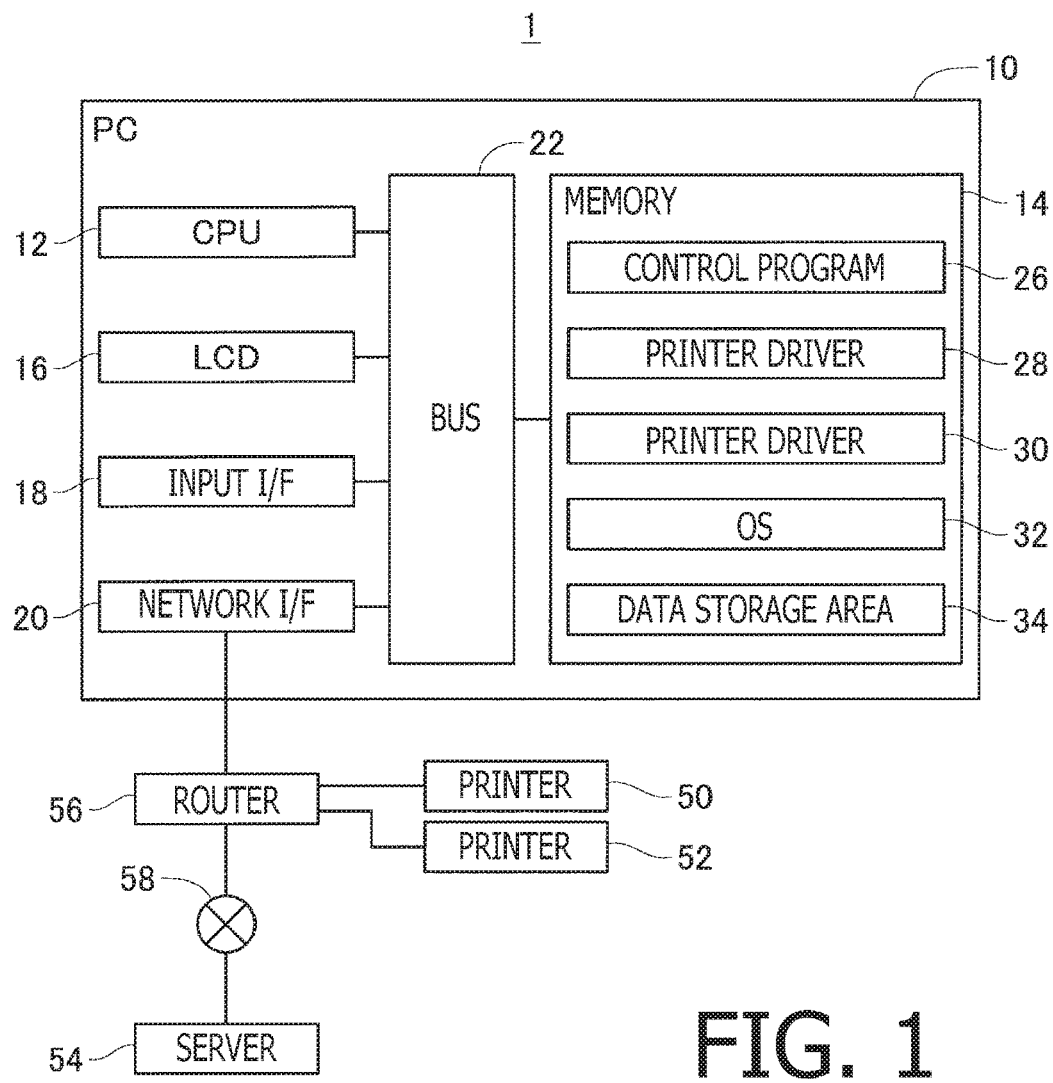
FIG. 1 is a block diagram of a communication system according to an illustrative embodiment.

FIG. 1 is a block diagram of a communication system 1 according to an illustrative embodiment of the present disclosures. The communication system 1 includes a PC (which is an example of an information processing apparatus) 10, a printer (which is an example of a printer) 50, a printer 52, a server 54, a router 56 and the Internet 58.

The PC 10 is mainly provided with a CPU (which is an example of a computer and a controller) 12, a memory 14, an LCD (which is an example of a display I/F) 16, an input I/F (which is an example of a user operation reception I/F) 18, and a network I/F (which is an example of a communication I/F) 20, which are communicatably interconnected with each other through a bus 22.

The CPU 12 executes various processes in accordance with a control program 26 (which is an example of an application), a printer driver 28, a printer driver 30, and an OS 32 stored in the memory 14. The control program 26 is a program used to browse and enabling a user to print files of particular formats (e.g., PDF files), an example of which being Adobe Reader®. The printer driver 28 is a device driver of the printer 50, and controls an operation of the printer 50. The printer driver 30 is a printer driver of the printer 52, and controls an operation of the printer 52. That is, the printer drivers 28 and 30 are programs which, when executed by the CPU 12, control the printers 50 and 52, respectively. The OS 32 is a program providing basic functions which are used by the control program 26, and the printer drivers 28 and 30.

It is noted that, in the following description, the CPU 12 executing control program 26 and the like will occasionally be referred to by the name of the program. For example, the CPU 12 executing the control program 26 to perform a certain process will occasionally be described such that the control program 26 executes the certain process.

The memory 14 has a data storage area 34. The data storage area 34 is an area configured to store data necessary to execute the control program 26 and the like. According to the illustrative embodiment, the memory 14 is configured as a combination of a RAM, a ROM, a flash memory, an HDD and a buffer provided to the CPU 12 or the like.

It is noted that the memory 14 may be a computer-readable storage medium. The computer-readable storage medium is a non-transitory medium. The non-transitory medium includes, in addition to the computer-readable storage medium above, a recording medium such as a CD-ROM, a DVD-ROM and the like. It is also noted that the non-transitory medium is a tangible medium. In contrast, an electrical signal carrying programs downloaded from a server on the Internet or the like is a computer-readable signal medium, which is one type of a computer-readable medium, is not included in the non-transitory computer-readable storage medium.

The LCD 16 is configured to display various functions of the PC 10. The input I/F 18 includes a keyboard and a mouse, and serves as an interface through which user operations are input to the CPU 12. The network I/F 20 is connected to the printers 50 and 52 through the router 56. Further, the router 56 is connected to the server 54 through the Internet 58. According to the above configuration, the PC 10 transmits/receives information to/from the printers 50, 52 and the server 54.

According to the illustrative embodiment, the printer 50 is a device configured to perform printing on a particular sheet, for example, a tape-type sheet 60 (see FIG. 5B) 60. The printer 52 is a device configured to perform printing on a generally used sheet, for example, an A4-size sheet (see FIG. 5A) 62 and the like.

<Operation of Communication System>

It is noted that, in the following description, processes of the CPU 12 in accordance with instructions scripted in programs are basically indicated. Processes indicated by terms "determine", "extract", "select", "calculate", "judge", "identify", "obtain", "receive", "control", and "set" are the processes of the CPU 12. It is noted that the processes executed by the CPU 12 include a hardware control through the OS 32. It is further noted that the term "obtain" will be used to mean a concept in which a request is not necessary. That is, a process in which the CPU 12 receive data without requesting for the same is included in a concept that the CPU 12 obtains the data. Further, a term "data" in the specification is represented by a computer-readable bit array. A plurality of pieces of data having substantially the same meaning/contents but different formats will be treated as the same data. A term "information" used in the specification will be treated in the same manner. Further, the processes of "instruct", "respond" and "request" are executed by communicating information/data indicating "instruct", "respond" and "request", respectively. Further, the process such as "setting" is executed by storing the input setting information in the memory.

The communication system 1 is configured to perform printing of item labels which are used for a service provided by a service providing company. An example of such service is known as FULFILMENT by AMAZON®.

Figure 2:
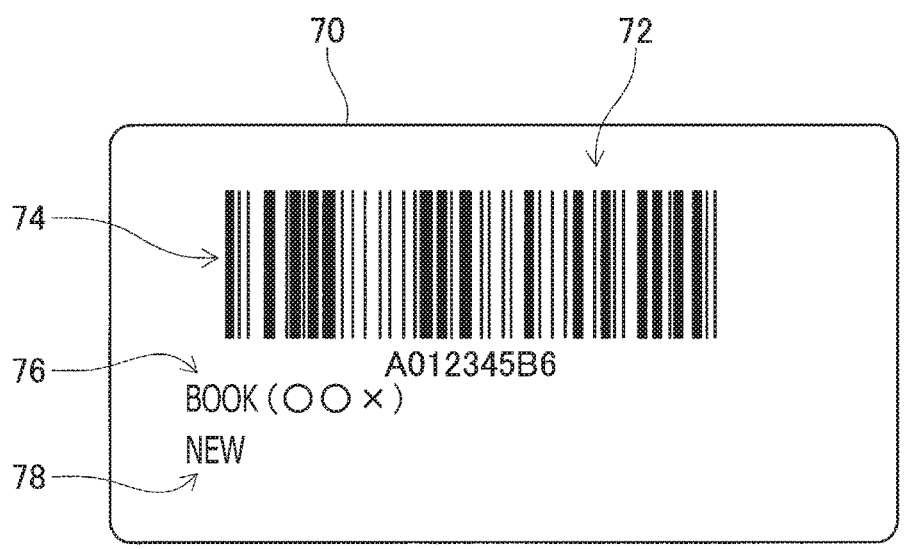
FIG. 2 shows an example of a barcode image.

According to the illustrative embodiment, the server 54 is a server operated by the service providing company. The PC 10 operated by the user accesses the server 54 to obtain image data representing an image to be printed on item labels 70. As shown in FIG. 2, the image (hereinafter, referred to as a barcode image; which is an example of a first object) 72 to be printed on the item label 70 includes a barcode 74 to identify an item, an item name 76 indicating the name of the item to be exhibited, and condition of the item. The user is required to attach the item label to each of exhibition object items. Accordingly, it is necessary for the user to obtain image data representing a barcode corresponding to each of the exhibition object items (hereinafter, such image data being referred to as barcode image data). That is, when the number of the exhibition object items is ten, the user needs to obtain ten pieces of barcode image data respectively representing the ten exhibition object items from the server 54.

Therefore, with use of the PC 10, the user obtains image data of the item labels 70 representing the sales object items, namely, the barcode image data representing the barcode images 72 from the server 54. According to the illustrative embodiment, the barcode image data obtained from the server 54 is PDF format image data. The user accesses a webpage of the server 54 using the PC 10, and inputs a seller account of the user, item names, the number of items, condition of the items and the like. Further, the user inputs, to the webpage, that the printing sheet is an A4 size label sheet 62 on which 21 item labels 70 are arranged in a matrix of seven rows and three columns. Then, the server 54 creates PDF format image data representing an image in which the barcode images are arranged at positions corresponding to the item labels which are arranged in the matrix of seven rows and three columns, and transmits the thus created image data to the PC 10. When, for example, the user inputs that the user intends to sell three items A and seven items B, the barcode images 72 include three barcode images respectively indicating the items A, and seven barcode images respectively indicating the items B. Each of the barcode images indicating the items A and the barcode images indicating the items B is an example of a first object.

Figure 3:
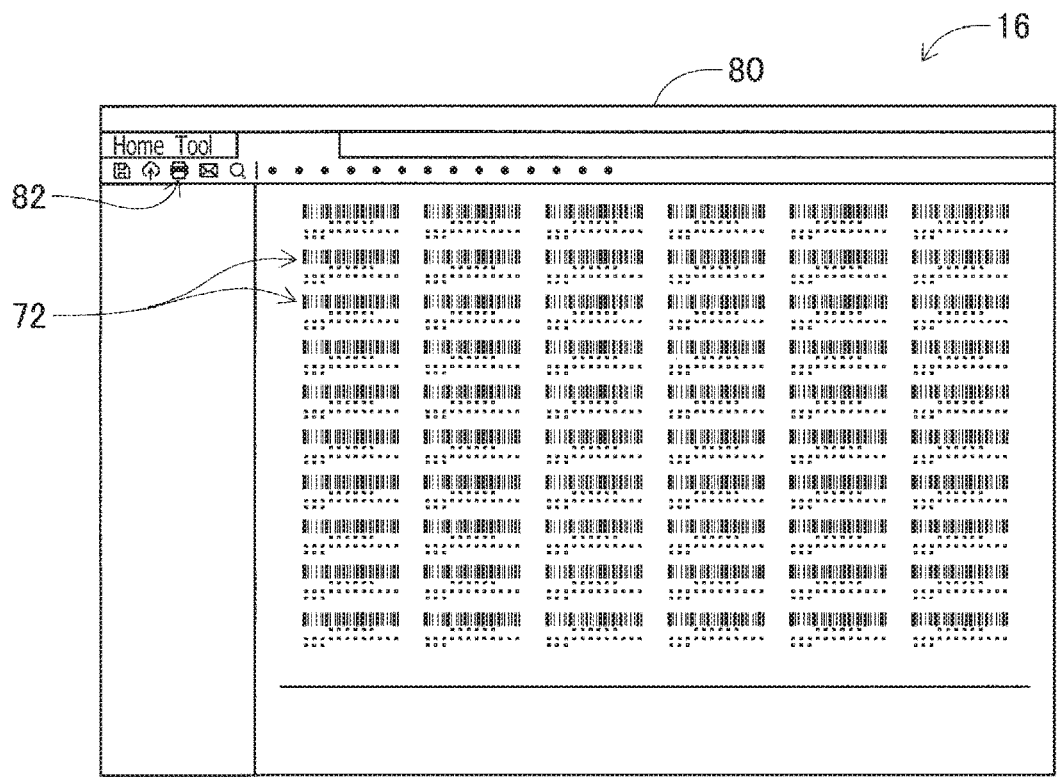
FIG. 3 shows a barcode image display screen.

The control program 26 is an application displaying PDF format image data. The control program 26 displays a barcode image display screen 80 shown in FIG. 3 on the LCD 16 based on the PDF format image data created by the server 54. It is noted that, in the image data created by the server 54, objects other than the barcode image 72 (e.g., a logo of the service providing company) may be or may not be included.

Figure 4:
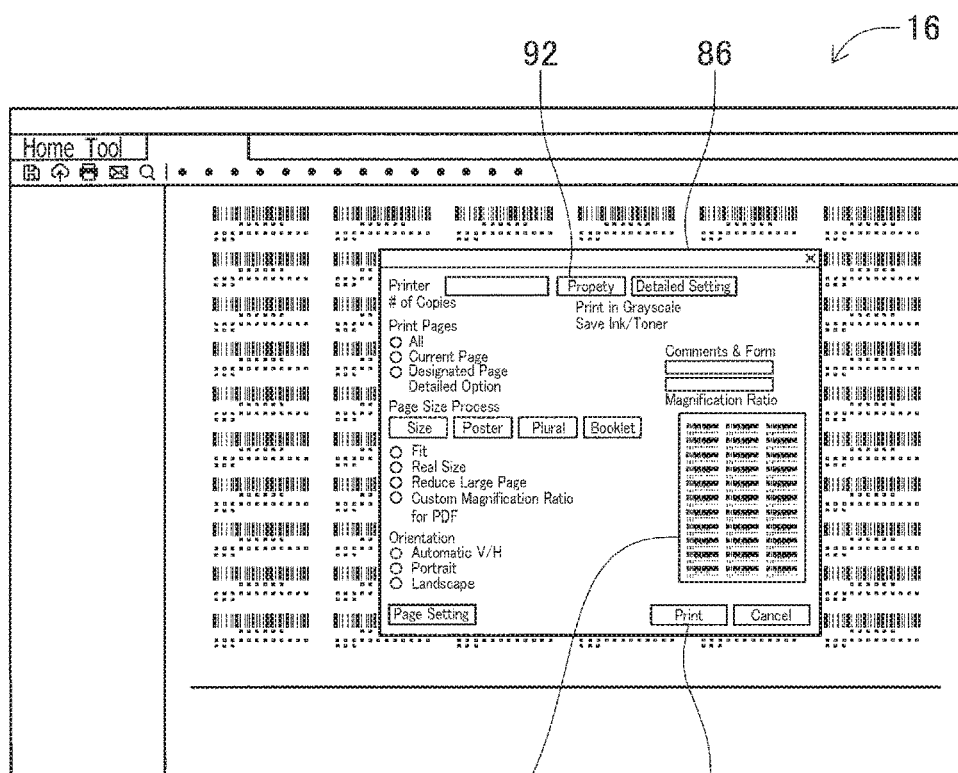
FIG. 4 is an application-compliant setting screen 86.

When a print button 82 is operated on the barcode image display screen 80, as the control program 26 is executed, and an application-compliant setting screen 86 shown in FIG. 4 is displayed on the LCD 16. When a print button 88 is operated on the application-compliant setting screen 86, the control program 26 is executed, the image data is obtained from the server 54, then, the print-target barcode image data is transmitted to the printer driver 30. When the printer driver 30 receives the image data, as the printer driver 30 is executed, image data for printing (hereinafter, referred to as print image data) which is used to print an image representing the print-target barcode images 72 to be printed on the printing sheet is created based on the received image data. It is noted that, in the application-compliant setting screen 86, an input to select the printer 52 as the device performing the printing process may be done, or an input of various pieces of print setting information may be done.

In the printer 52, as the printing sheet on which a plurality of barcode images 72 are printed, for example, a label sheet 62 shown in FIG. 5A is used. The label sheet 62 is an A4 size sheet, which includes 21 item labels 70 arranged in a matrix of seven rows and three columns. The number 21 of the item labels 70 on one label sheet 62 is an example of a first number).

It is noted that, when a print process of the barcode image is performed using the label sheet 62 which has 21 item labels 70, the item labels 70 on which the barcode images 72 are not printed may wastefully remained. For example, when the number of exhibition object items is ten, ten pieces of barcode image data are obtained from the server 54, and the barcode images 72 are printed on the item labels 70 of the label sheet 62 based on the ten pieces of image data. In such a case, as shown in FIG. 5A, the barcode images 72 are printed on ten of twenty-one (21) item labels 70, but the barcode images 72 are not printed on the other eleven item labels 70. When no images are printed on the remaining eleven item labels 70, the eleven item labels 70 are wasted.

In view of the above, the communication system 1 is configured such that, in the printer 50, a print process of the barcode image 72 is performed using a tape-type label sheet 60 on which the item labels 70 are arranged in one line, or one column (which is an example of an N column) as shown in FIG. 5B.

The tape-type label sheet 60 includes a plurality of item labels 70 arranged in one column (i.e., one line) along a direction where the tape-type label sheet 60 extends. The label sheet 60 is rolled and accommodated in the printer 50. On the item labels 70 included in the label sheet 60, the images are sequentially printed on the item labels 70. Further, the printer 50 is configured such that, every time when the barcode image 74 is printed on the item label 70, the printer 50 can cut out the printed item label 70 of the label sheet 60. In other words, the printer 50 is configured to print an image on a portion (of which size is an example of a second size) of the label sheet 60, which portion will be cut out from the label sheet 60 after one image has been printed on the tape-type label sheet 60. The size of a portion on which an image is printed is, for example, 52 mm×29 mm, or 62 mm×29 mm. It is noted that the printer 50 is configured to print images on the label sheet 60 having item labels of which size is 52 mm×29 mm, 62 mm×29 mm or the like, but the printer 50 may not be configured to execute a print process on a generally used printing sheet such as an A4 size printing sheet.

In response to the printer 52 being selected as a device which is to perform the print process, the control program 26 requests the printer driver 28 for capability information of the printer 50. When the printer 52 is selected as the device to perform the print process, the control program 26 may request the printer driver 28 for capability information at a timing when the application-compliant setting screen 86 is displayed, or at another timing. The control program 26 requests the printer driver 28 for the capability information by, for example, calling of an API (Application Programming Interface) (e.g., GetPrintCapabilities). When receiving the API call, the printer driver 28 outputs the capability information of the printer 50 to the control program 26. The capability information is information indicating a performance regarding the print process of the printer 50, and includes usable printing sheet sizes.

Then, the control program 26 determines setting contents of the application-compliant setting screen 86 based on the capability information received from the printer driver 28. Concretely, as settable sizes of the printing sheets, 62 mm×29 mm and the like are set, while the sizes of the generally used printing sheets such as the A4 size will not be set. With this configuration, when the printer 50 is set as the device which performs the print process, only the sizes of the sheets on which the printer 50 can performs the print process are selectable on the application-compliant setting screen 89. Further, as the size of the settable printing sheet, the size of 62 mm×29 mm is set, it is indicated on a preview screen 90 of the application-compliant setting screen 86 that the print process can be performed on the printing sheet of which size is 62 mm×29 mm.

When a property button 92 is operated on the application-compliant setting screen 86, by the API call from the control program 26, the printer driver 28 is requested to display the setting screen, thereby the printer driver 28 displaying a driver-compliant first setting screen 100 shown in FIG. 7 on the LCD 16. The driver-compliant first setting screen 100 is a screen through which print setting information of a normal label print process by the printer 50 is input. On the driver-compliant first setting screen 100, size setting buttons 102 for setting the sizes of the printing sheets, a mirror print setting button 104 for setting a mirror print process, and a trim setting button 106 for setting a trim print process are displayed.

The mirror print process is a process of printing an image in a reversed manner as if the image is mirrored. A trim process is a process of printing an image with trimming a blank space if there is a blank space at a trailing end of the image which is to be printed on the item label 70. Then, the size setting buttons 102 and the like are operated on the driver-compliant first setting screen 100 to input various pieces of print setting information, and thereafter, when an OK button 108 is operated, a normal label print process to be executed by the printer 50 is finished.

Not only on the driver-compliant first setting screen 100, but on a driver-compliant second setting screen 112 shown in FIG. 8, it is possible to set the normal label print process. When an advanced setting tab 109 is operated, the printer driver 28 displays the driver-compliant second setting window 112 on the LCD 16. On the driver-compliant second setting screen 112, radio buttons 114 for setting image tone, a first slider 115 for setting brightness, a second slider 116 for setting contrast and the like are displayed. When, on the driver-compliant second setting screen 112, the radio buttons 114 and the like are operated to input the various settings, and thereafter, when the OK button 108 is operated, setting of the normal label print process to be executed by the printer 50 is finished. The normal label print process by the printer 50 will be described in detail later.

When a crop print tab 118 is operated, the printer driver 28 displays a driver-compliant third setting screen 120 as shown in FIG. 9 on the LCD 16. The driver-compliant third setting screen 120 is a screen for inputting the print setting information of the crop print process by the printer 50. On the driver-compliant third setting screen 120, a checkbox 122 for inputting the crop print setting information indicating that the crop print setting is ON, a side setting button 124 for inputting the setting information indicating the size of the printing sheet, a print image 126 of the label sheet 60, on which the print process is performed by the crop print process is displayed, are displayed. It is noted that the crop print process is, as described above, a print process of extracting the barcode image data which includes the barcode data and is obtained from the server 54, and printing the barcode images 72 represented by the barcode image data on the item labels 70 of the label sheet 60 by the printer 50.

When the user wishes the crop print process is performed, the user operates to check the checkbox 122 on the driver-compliant third setting screen, thereby the crop print process being effective. Then, the user operates the side setting button 124 to input the setting information indicating the size of the sheet. According to the illustrative embodiment, with the size setting button, only the setting information indicating the size of the label size sheets 62 can be input.

As above, on the driver-compliant third setting screen 120, the checkbox 122 and the like are operated to input the various pieces of print setting information, and thereafter, when the OK button 108 is operated, input of the setting information regarding the crop print process to be executed by the printer 50 is finished.

Further, the print setting information input through the driver-compliant first setting screen 100 and the driver-compliant second setting screen 112 are also used in the crop print process.

When the crop print process is effective, the radio buttons 114 of the driver-compliant second setting screen 112 are grayed out, thereby excluded from user operation targets. It is because, the crop print process is a process of printing the barcode images 72 on the item labels 70, and it is preferable that an appropriate image tone for printing the barcodes 72 is set in advance, while it is not preferable that the user changes the print image tone arbitrarily. It is noted that, even if the crop print process is effective, the first slider 115 and the second slider 116 of the driver-compliant second setting scree 112 are not excluded from the user operation targets. Accordingly, it is possible for the user to change the brightness and the contrast of the print setting when the crop print process is performed.

When the crop print process is effective, the size setting buttons 102, the mirror print setting button 104 and the trim setting button 106 are grayed out on the driver-compliant first setting screen 100 shown in FIG. 7, thereby excluded from the user operation target. It is because, the size of the printing sheet is set on the driver-compliant third setting screen 120, and it is not preferable to change the size of the printing sheet on the driver-compliant first setting screen 100. The mirror print process is a process of printing the image as if the image is mirrored. If the barcode 72 is printed reversely, the barcode may not be correctly read. Therefore, the mirror print process is not appropriate for the print process of the barcode image 72. Further, the trim print process is a process of printing an image with removing a blank space at the trailing end of the image. If a blank space is included at an end portion of a barcode in the barcode image 72 and is removed, the barcode may not be correctly read. therefore, the trip print process is not appropriate as the print process of the barcode image 72.

When the checkbox 122 and the size setting button 124 are operated on the driver-compliant third setting screen 120 and the crop print process is set to be effective, or when the first slider 115 and the like is operated on the driver-compliant second setting screen 112, and thereafter, the OK button 108 is operated, the printer driver 28 outputs "DevMode" 130 shown in FIG. 10A to the control program 26.

It is noted that "DevMode" 130 is an example of an information structure, and indicates the print setting information input through the driver-compliant first setting screen 100, the driver-compliant second setting screen 112, and the driver-compliant third setting screen 120. As shown in FIG. 10A, the information structure DevMode 130 includes a Public area 132 and a Private area 134. The Public area 132 includes a structure member dmpapersize (which is known as dmPaperSize defined by Microsoft® as a structure member of the information structure DevMode), and elements width and height, while the Private area 134 includes an element outputpapersize, and the elements width and height, the crop print process information, the mirror print process information, and the trim print process information. It is noted that the structure member dmpapersize indicates an ID number which represents a sheet size. Similarly, the element outputpapersize also indicates an ID number which represents a sheet size. Thus, the structure member dmpapersize and the element outputpapersize are related to each other.

The structure member dmpapersize included in the Public area 132 indicates an ID number indicating the sheet size of the image including one or more print-target barcode images 72, and the elements width and height included in the Public area 132 are concrete dimensions of the sheet size corresponding to the ID number. The element outputpapersize included in the Private area 134 indicates an ID number indicating the printing sheet size, and the elements width and height included in the Private area 134 are concrete dimensions of the sheet size corresponding to the ID number.

According to the illustrative embodiment, the ID number "261" is the size of the sheet (which is an example of the first size) including the A4 size sheet and the Letter size sheet. As shown in FIG. 11, the size of the A4 size sheet 140 is 210 mm×297 mm, and the size of the Letter size sheet 142 is 215.9 mm×279.4 mm Therefore, the size of the sheet 144 which covers both the A4 size sheet 140 and the Letter size sheet 142 is 215.9 mm×297 mm, and the ID number "261" indicates the size of such a sheet, which will be referred to as an A4-Letter size. Further, the ID number "260" indicates the sheet size of 62 mm×29 mm.

Thus, the information structure DevMode 130 shown in FIG. 10A indicates that the sheet size of an image including one or more print-target barcode images 72 is the A4-Letter size, and the size of the printing sheet is 62 mm×29 mm indicates the sheet size which is the label size printable by the printer 50.

The crop print process information included in the Private area 134 is the print setting information input through the driver-compliant third setting screen 120, that indicates the print setting information input by the user operation with respect to the checkbox 122. It is noted that the information structure DevMode 130 shown in FIG. 10A is output when the crop print process is effective. Therefore, in the information structure DevMode 130 shown in FIG. 10A, the crop print process information included in the Private area 134 is set to ON. That is, it is indicated in the information structure DevMode 130 shown in FIG. 10A that the crop print process is set.

The mirror print process information and the trim print process information included in the Private area 134 indicate the print setting information input through the driver-compliant first setting screen 100, that is, the print setting information input by operations with respect to the mirror setting button 104 and the trim setting button 106. It is noted that the information structure DevMode 130 shown in FIG. 10A is output when the crop print process is set to be effective. When the crop print process is effective, the mirror setting button 104 and the trim setting button 106 are excluded from the user operation targets. That is, when the crop print process is effective, it is impossible to set a state to perform the mirror print process or the trim print process. Accordingly, in the information structure DevMode 130 shown in FIG. 10A, the mirror print process information and the trim print process information included in the Private are 134 are indicated to be in OFF states, respectively. That is, the information structure DevMode 130 shown in FIG. 10A indicates that either the mirror print process or the trim print process is not set.

The control program 26 outputs a print instruction to the printer driver 28 through the OS 32. For example, when the print button 88 is operated on the application-compliant setting screen 86 (see FIG. 6), the control program 26 outputs the print instruction to the printer driver 28. In this case, raster format image data (which is an example of first image data) which has been converted, based on the PDF format image data, so that the printer driver 28 can interpret, and the thus converted raster image data is output to the printer driver 28 together with the print instruction and the information structure DevMode 130 received from the printer driver 28. It is noted that the PDF format image data has been converted to image data representing an image of which size corresponds to the sheet indicated by the structure member dmpapersize in accordance with the information structure DevMode 130 which the control program 26 has received from the printer driver 28. When the control program 26, which received the information structure DevMode 130 shown in FIG. 10A, outputs the PDF data which is created by the server 54 such that the barcode images 72 are arranged to correspond to the item labels 70 of the A4 size label sheet 62, the image data which has been converted to the raster format image data representing the A4-Letter size image is output to the printer driver 28. According to the illustrative embodiment, the PDF format image data, created by the server 54 and representing the A4 size image, is converted to the image data representing the A4-Letter size image, without being magnified/reduced. It is noted that the Letter size image data created by the server 54 is also converted to the image data representing the A4-Letter size image without being magnified/reduced.

When the print setting information is input to the printer driver 28 at a timing other than the timing at which the property button 92 is operated in the application-compliant setting screen 86, the control program 26 outputs the image data to the printer driver 28, through the OS 32, at a timing after receipt of the information structure DevMode 130 from the printer driver 28.

Next, when receiving the print instruction and the like from the control program 26, the printer driver 28 requests the OS 32 to convert the vector format image data received together with the print instruction to the bitmap format image data. In response to receipt of the above request, the OS 32 converts the vector format image data to the bitmap format image data.

Next, based on the information structure DevMode 130 as shown in FIG. 10 and received together with the print instruction, the printer driver 28 determines whether the print process subject to the print instruction received from the control program 26 is the crop print process. As mentioned above, the crop print process information is included in the Private area 134 of the information structure DevMode 130. When the crop print process information is set to ON, the crop print process is effective, while when the crop print process information is set to OFF, the crop print process is not effective. Thus, based on the information structure DevMode 130, it is determined whether the print process subject to the print instruction is the crop print process or not.

When it is determined, based on the information structure DevMode 130 received from the control program 26, that the print process subject to the print instruction received from the control program 26 is the crop print process, it is further determined whether the structure member dmpapersize included in the Public area 132 of the information structure DevMode 130 indicates the A4-Letter size or not. When it is determined that the structure member dmpapersize indicates the A4-Letter size, the printer driver 28 extracts the image data indicating the barcode image 72 (which is an example of second image data) from the bitmap format image data converted by the OS 32.

Specifically, the printer driver 28 firstly analyzes the bitmap format image data and detects characteristic data having characteristics as the image data indicating the barcode. Then, the printer driver 28 obtains position information indicating a position of the image designated by the detected characteristic data as position information indicating the position of the barcode 74 included in the barcode image 72. Then, the printer driver 28 calculates an offset amount of the barcode 74 with respect to a coordinate of a particular corner of the image based on the bitmap format image data. To the printer driver 28, dimensions of the width and height of the barcode image 72 have been input in advance. Then, the printer driver 28 identifies an area of the barcode image 72 (hereinafter, referred to a cropping area) extracted from the image based on the bitmap format image data, based on the offset amount of the barcode 74, and the dimensions of the width and the height of the barcode image 72. Then, the printer driver 28 extracts the image data of the cropping area from the image data of the bitmap format. Thus, the image data of the barcode image 72 is extracted. Incidentally, when a plurality of pieces of characteristic data are detected, the printer driver 28 extracts the image data of the plurality of barcode images 72 respectively corresponding to the detected plurality of pieces of characteristic data. The printer driver 28 stores data indicating the number of extracted barcode images 72 in the memory 14.

Next, when the image data of the barcode images 72 are extracted, the printer driver 28 determines whether the barcode images 72 fit in their print areas, respectively. Firstly, the print areas of the barcode images 72 are identified based on an outputpapersize included in the private area 134 of the information structure DevMode 130 received from the control program 26. For example, in the information structure DevMode 130 indicated in FIG. 10A, the ID number of the outputpapersize is "260" and the printing sheet size is 62 mm×29 mm. Further, the ID numbers and printing areas having the sheet sizes corresponding to the ID numbers are respectively associated with each other. Therefore, the printing area corresponding to the ID number "260" is identified. Then, it is determined whether the barcode images 72 fit in the identified printing areas, respectively.

In this case, when it is determined that the barcode image 72 cannot fit in the printing area, the barcode image 72 protrudes from the area of the sheet of 62 mm×29 mm, that is the sheet of which size is input thorough the driver-compliant third setting screen 120 as shown in FIG. 9. Therefore, an error process (e.g., a process of displaying an error screen indicating that the crop printing cannot be performed) is executed. On the other hand, when it is determined that the barcode image 72 fits in the printing area, it is determined whether barcode image 72 fits in the printing area when the barcode image 72 is oriented such that a direction in which lines constituting a striped pattern of the barcode extend is aligned with a sub scanning direction.

When it is determined that the barcode image 72 fits in the printing area, the printer driver 28 creates the image data such that the barcode image 72 is arranged within the printing area having the printing sheet size, that is, the printing area of the sheet of which size is 62 mm×29 mm Next, the printer driver 28 converts the image data to image data having a format which is printable by the printer 50 (e.g., the vector format image data), and creates the print image data (which is an example of first print data). In this case, one barcode image 72 is not arranged over two or more sheets each having the size of 62 mm×29 mm, but is arranged on one sheet of 62 mm×29 mm, thereby the print image data for printing the one barcode image 72 is arranged.

Then, the printer driver 28 outputs the print image data to the printer 50. According to the above configuration, when the print process based on the print image data is performed by the printer 50, the barcode image 72 is printed such that the lines constituting the striped pattern of the barcode 74 extend in the sub scanning direction. Thus, it is possible that displacement of the lines constituting the striped pattern of the barcode 74 can be prevented, and the barcode 74 can be printed appropriately.

When the orientation of the barcode 74 is aligned such that the direction in which the lines constituting the striped pattern of the barcode 74 of the barcode image 72 extend is the sub scanning direction, and it is determined that the barcode image 72 does not fit in the printing area, the printer driver 28 applies a rotating process to the barcode image 72. Specifically, the orientation of the barcode image 72 assumed to be rotated by 90 degrees. Next, the printer driver 28 creates the image data such that the rotated barcode image 72 is arranged in the print area of the sheet size of 62 mm×29 mm. Then, the printer driver 28 converts the image data to image data having a format which is printable by the printer 50 (e.g., the vector format image data) to create the print image data. Then, the printer driver 28 outputs the thus created print image data to the printer 50.

As above, the crop print process is performed. In the crop print process, when the PC 10 obtains the image data in which the barcode images 72 are arranged corresponding to the item labels 70, which are arranged in a matrix of seven rows and three columns, the PC 10 extracts the image data of the barcode images 72 from the image data. Then, the PC 10 creates the print image data so that the extracted barcode images 72 are printed on the label size printing sheets, respectively, thereby the printer 50 printing the barcode image 72 on the label size sheet. It is noted that the printer 50 prints one barcode image 72 on one label size sheet.

That is, as the crop print process is performed, the printer 50 prints, for example, ten barcode images 72 on ten label size sheets, respectively. On the other hand, in the printer 52, when ten barcode images 72 are to be printed on the label sheet 62 including the twenty-one item labels 72 arranged in a matrix of seven columns and three rows (see FIG. 5A), eleven item labels 70 are wasted unprinted. According to the printer 50, it is possible to print the ten barcode images 72 without wasting even a single label size sheet (i.e., the item label 70). As above, by performing the crop print process, it becomes possible to restrict wasting of the item labels 70.

It is noted that, when the crop print process is being set in accordance with the above procedure, by executing the control program 26, there could be a case where an API call (e.g., GetPrintCapabilities) is output to the printer driver 28. In such a case, the printer driver 28 outputs the information indicating that a settable sheet size is the A4-Letter size to the control program 26 as the capability information. In a state where the crop print setting is not set, when the printer driver 28 receives the API call (e.g., GetPrintCapabilities), the printer driver 28 outputs the information indicating that a settable sheet size is a label size (e.g., 62 mm×29 mm) to the control program 26 as the capability information.

In the printer 50, it is possible to perform the normal print process, that is, the aforementioned normal label print process can be performed, instead of the crop print process. Specifically, in the driver-compliant first setting screen 100 shown in FIG. 7, the user selects the printing sheet size by operating the size setting buttons 102. Further, in the label print process, when the user wishes to perform the mirror print process or the trim print process, the user can input settings of the mirror print process or the trim print process by operating the mirror setting button 104 or the trim setting button 106. Then, when the OK button 108 is operated after various pieces of print setting information have been input, the printer driver 28 outputs the information structure DevMode 130 shown in FIG. 10B to the control program 26.

In the information structure DevMode 130 shown in FIG. 10B, the structure member dmpapersize in the Public area 132 represents the ID number indicating the size of the printing sheet selected by the size setting buttons 102 on the driver-compliant first setting screen 10. Concretely, in this example, the ID number is "260" indicating the sheet of which label size is 62 mm×29 mm. The width and the height in the Public area 132 are concrete dimensions (values) of the sheet corresponding to the ID number. Further, the element outputpapersize in the Private area 134 indicates the ID number same as the structure member dmpapersize in the Public area 132 (i.e., "260"), and the width and height in the Private area 134 are concrete dimensions of the sheet size corresponding to the ID number.

Further, the crop print process information in the Private area 134 is set to OFF. It is because the print setting information input through the driver-compliant first setting screen 100 is not the setting information of the crop print process, but is the setting information for the normal label print process. It is noted that the mirror print process information and the trim print process information in the Private area 134 are set to ON or OFF in accordance with user's operations of the mirror print setting button 104 and the trim setting button 106 on the driver-compliant first setting screen 100.

When the control program 26 has received the information structure DevMode 130 shown in FIG. 10B and outputs the print instruction, the structure member dmpapersize included in the Public area 132 of the information structure DevMode 130, that is, the vector format image data representing the image having the label size of 62 mm×29 mm, the information structure DevMode 130 shown in FIG. 10B and the print instruction are output to the printer driver 28 through the OS 32.

After transmitting the information structure DevMode 130 shown in FIG. 10B to the control program 26, the printer driver 28 receives the print instruction, the information structure DevMode 130 shown in FIG. 10B and the vector format image data representing the image having the label size of 62 mm×29 mm from the control program 26.

Next, the printer driver 28 determines whether the print process subject to the print instruction received from the control program 26 is the crop print process based on the information structure DevMode 130 received from the control program 26, that is, the information structure DevMode 130 shown in FIG. 10B. At this time, since the crop print process information is set to OFF in the information structure DevMode 130 shown in FIG. 10B, it is determined that the print process subject to the print instruction is determined not to be the crop print process.

When it is determined that the print process subject to the print instruction is determined not to be the crop print process, it is determined whether the structure member dmpapersize included in the Public area 132 of the information structure DevMode 130 indicates the label size. When it is determined that the structure member dmpapersize is determined to indicate the label size, the printer driver 28 converts the bitmap format image data converted by the OS 32 to image data having a format printable by the printer 50 (e.g., the vector format image data), thereby creating the print image data. Then, the printer driver 28 outputs the created print image data to the printer 50. By the printer 50, the print process is performed based on the print image data output by the printer driver 28, thereby the normal label print process being completed.

It is noted that, when the image indicated by the PDF data includes only one barcode image 72, there could be a case where the number of the barcode images included in the image represented by the print image data created by the printer drive 28 is the same as the number of barcode images included in the image represented by the PDF data. However, such a case is an exceptional case. Normally, the number of the barcode images included in the image represented by the print image data created by the printer driver 28 is less than the number of barcode images 72 included in the image represented by the PDF data.

<Process of Printer Driver>

The crop print process and the normal label print process described above are performed as the CPU 12 of the PC 10 executes the printer driver 28. Hereinafter, referring to FIGS. 12-15, processes when the printer driver 28 is executed by the CPU 12 will be described.

When the control program 26 outputs the API call by displaying the barcode image display screen 80, the printer driver 28 receives, as shown in FIG. 12, the API call (S100). Then, when receiving the API call, the printer driver 28 determines whether the crop print process is set on the driver-compliant third setting screen 120 shown in FIG. 9 (S102).

When the crop print process is set (S102: YES), the printer driver 28 outputs the capability information indicating the A4-Letter size as the printable sheet size to the control program 26 (S104). Then, the process illustrated in the flowchart shown in FIG. 12 is terminated. When it is determined that the crop print process is not set (S102: NO), the printer driver 28 outputs the capability information indicating the label size as the settable sheet size to the control program (S106). Then, the process illustrated in the flowchart shown in FIG. 12 is terminated.

When the control program 26 outputs the API call in response to operation of the property button 92 on the application-compliant setting screen 86 (see FIG. 6), the printer driver 28 receives the API call (S110) as shown in FIG. 13. When the API call is received, the printer driver 28 displays the driver-compliant first setting screen 100 on the LCD 16 (S112). In response to the operation of the crop print tab 118, the printer driver 28 displays the driver-compliant second setting screen 112 or the driver-compliant third setting screen 120 on the LCD 16 (S112).

When the OK button 108 is operated in the driver-compliant first, second or third setting screen 100, 112 or 120, the printer driver 28 receives the operation of the OK button 108 (S114). Next, when the operation of the OK button 108 is received, the printer driver 28 determines whether the crop print process is set (S116).

When the crop print process is set (S116: YES), the printer driver 28 outputs the information structure DevMode 130 shown in FIG. 10A, that is, the information structure DevMode 130 indicating the A4-Letter size as the structure member dmpapersize to the control program 26 (S118). Thereafter, the process show in FIG. 13 is terminated. On the other hand, when the crop print process is not set (S116: NO), the printer drive 28 outputs the information structure DevMode 130 shown in FIG. 10B, that is, the information structure DevMode 130 indicating the label size as the structure member dmpapersize to the control program 26 (S120). Then, the process shown in FIG. 13 is terminated.

Further, when the control program 26 outputs the print instruction, the image data and the information structure DevMode 130, the printer driver 28 receives the same as shown in FIG. 14 (S130). Then, the printer driver 28 requests the OS 32 to convert the vector format image data to the bitmap format image data (S132). Next, the printer driver 28 receives the bitmap format image data from the OS 32 (S134).

Next, in S136, the printer driver 28 determines whether the print process subject to the print instruction is the crop print process based on the information structure DevMode 130 received in S130. When it is determined that the print process subject to the print instruction is the crop print process (S136: YES), the printer driver 28 determines whether the structure member dmpapersize in the Public area 132 of the information structure DevMode 130 received in S130 indicates the A4-Letter size (S138).

When it is determined that the structure member dmpapersize in the Public area 132 indicates the A4-Letter size (S138: YES), the printer driver 28 extracts, in S140, the barcode images 72 from the bitmap format image data received in S134. Next, the printer driver 28 determines whether the barcode images 72 are extracted from the bitmap format image data based on data indicating the number of extracted barcode images 72 stored in the memory 14 (S142). When it is determined that the barcode images 72 are extracted (S142: YES), the printer driver 28 determines whether there exists a barcode image 72 which has been extracted but not processed (S143). Specifically, the printer driver 28 determine whether there remains a barcode image 72 which has not been subjected to S144-S154 (described later) among the barcode images 72 having been extracted. When there exists an unprocessed extracted barcode image 72 (S143: YES), the printer driver 28 determines whether the extracted barcode image 72 fits within the print area of the sheet (S144).

When it is determined that the extracted barcode image 72 fits within the print area of the sheet (S144: YES), the printer driver 28 determines whether the barcode image 72 fits within the print area of the sheet with the extending direction of the lines constituting the striped pattern of the barcode 74 of the barcode image 72 being aligned with the sub scanning direction (S146). When it is determined that the barcode image 72 fits in the print area of the sheet with the direction of the lines constituting the striped patter of the barcode 74 being aligned in the sub scanning direction (S146: YES), process proceeds to S148. When it is determined that the barcode image 72 does not fit in the print area of the sheet with the direction of the lines constituting the striped patter of the barcode 74 being aligned in the sub scanning direction (S146: NO), the printer driver 28 performs the rotating process of the barcode image 72 (S150). Thereafter, process proceeds to S148.

In S148, the printer driver 28 arranges the barcode image 72 within the print area of the sheet. Then, the printer driver 28 creates the print image data (S152). Next, the printer driver 28 transmits the print image data to the printer 50 (S154). As above, processes shown in FIGS. 14 and 15 is completed.

That is, the print image data for one barcode is created in S144-S154, and transmitted to the printer 50. Then, in S142, steps S144-S154 are repeated until decision in S142 is "NO" (i.e., ten times). By the above processes, ten barcode images 72 are printed. Further, when the print image data is transmitted to the printer 50, the printer 50 prints one of the labels 70 shown in FIG. 5B, and feeds the label sheet. Thereafter, as the process of S154 is executed by a plurality of times, that is, transmission of the print image data for one barcode is performed by a plurality of times, printing of one label by the printer 50 and feeding of the label sheet are repeatedly performed, thereby printing of the barcodes are performed with the labels being aligned in a line as shown in FIG. 5B.

When it is determined that the print process subject to the print instruction is not the crop print process (S136: NO), that is, the print process subject to the print instruction is the normal label print process, the printer driver 28 determines whether the structure member dmpapersize in the Public area 132 of the information structure DevMode 130 received in S130 indicates the label size (S156). When it is determined that the structure member dmpapersize of the Public area 132 indicates the label size (S156: YES), steps S152 and S154 are performed, and the process shown in FIGS. 14 and 15 is finished.

When the structure member dmpapersize of the Public area 132 indicates the label size (S138: NO), when no barcode image 72 is extracted from the bitmap format image data (S142: NO), when there is no unprocessed extracted barcode image 72 (S143: NO), when the barcode image 72 does not fit the print area of the sheet (S144: NO), or when the structure member dmpapersize of the Public area 132 indicates the A4-Letter size (S156: NO), an error process is performed (S158). Then, the process shown in FIGS. 14 and 15 is finished.

<Effects of Illustrative Embodiment>

The first size is the sheet size within which the first number of first objects can be arranged in M columns. The CPU 12 creates the first print data used to print the second number of first objects on a second size sheet with arranging the first objects in N columns which is smaller than the M columns Thus, the first objects can be printed on a sheet which has less number of columns than the first size sheet.

The second size is a size of a portion of the tape-type label sheet after the second number of first objects have been printed on the portion of the tape-type label sheet and cut out. With this configuration, the unprinted portion of the sheet can be used.

According to the illustrative embodiment, the first print data for printing one first object based on the extracted second image data on one second size sheet so as not to be arranged over two or more second size sheets. According to this configuration, the first object can be printed on only one second size sheet.

The first object is an object including a barcode. According to the illustrative embodiment, a rendering area of the barcode included in the first image data is detected, and the second image data is extracted from a particular area including the detected area. According to this configuration, the barcode can be appropriately printed as the first object.

The information processing apparatus has an operation receiving interface configured to receive user operations. In response to receipt of a first operation, by the operation receiving interface, to indicate printing of the first object on the second size sheet, a request for image data representing the first size image is output. Further, in response to output of a request for image data representing the first size image, the CPU receives the image data representing the first size image from the application. According to the above configuration, the information processing apparatus can obtain image data of the image including all the first objects.

The information processing apparatus is further configured such that, in response to receipt, by the operation receiving interface, of a second operation, which is different from the first operation and indicates printing on the second size sheet, a request of image data representing the second size image is output. Further, in response to output of the request for the image data representing the second size image, the CPU receives the image data representing the second size image from the application. Further, the CPU transmits second print data used to print the image data representing the second size image on the second size sheet to the printer through the communication interface. As above, the normal printing operation to print on the second size sheet can be performed.

According to the illustrative embodiment, in response to receipt of the first operation by the user operation receiving interface, information indicating that particular print setting information from the print setting information, which is executable when the user operation receiving interface receives the second operation, cannot be input is transmitted to the application. With this configuration, receipt of a user operation which cannot be executed is prevented.

According to the illustrative embodiment, in response to the user operation receiving interface receiving the first operation, output of image data of the second size image which is output when the user operation receiving interface receives the second operation is prevented, while output of the image data representing the first size image is permitted. According to this configuration, output of the image data representing the second size image can be avoided when the first operation is received.

In response to the user operation receiving interface receiving an operation to designated the second side as the sheet size, the first print data is created. That is, the print data corresponding to the operation is created.

According to the illustrative embodiment, the first image data is created such that the first object based on the extracted second image data is not magnified or reduced. According to this configuration, the first object having its original size can be printed.

According to the illustrative embodiment, the information processing apparatus has a displaying interface, and the application is capable of displaying the image, which is configured such that the first object is included in the first size image, on the displaying interface. The image, which is configured such that the first object is included in the second size image, can also be displayed on the displaying interface. With this configuration, the user can browse the image, which is configured such that the first object is included in the second size image, as a preview screen.

It is noted that aspects of the present disclosures need not be limited to the above-described configuration of the illustrative embodiment. Rather, various modifications/improvements could be proved based on the knowledge of person skilled in the art. For example, in the above-described illustrative embodiment, as printing sheets used by the printer 50, the label sheet 60 on which item labels 70 are arranged in one line (see FIG. 5B) is employed. However, the label sheet 66 on which the item labels 70 are arranged in two lines (see FIG. 5C) may be employed. In such a case, for example, the sheet size may be set to 104 mm×29 mm or 124 mm×29 mm, and the printer driver 28 may create the print image data arranging two barcode images in two lines in S144-S154 (FIG. 14), and transmit the same to the printer.

Further, in the above-described embodiment, the disclosed technique is applied to a method of printing barcode images 72 on the item labels 70. This technique may be applied to a method of printing various kinds of images on the item labels 70. For example, the technique may be applied to print a medicine dosing image illustrating a dosing method of medicine on a label which can be applied onto a notebook. In such a case, the printer driver 28 may extract dosing method image data, which is image data representing an image having a characteristic of medicine dosing method image in S140, and performs the steps after S140 with using the medicine dosing method image data as the target data.

According to the above-described illustrative embodiment, in response to the user operation to input a check in the checkbox 122, the crop print process is set to be effective. Optionally or alternatively, an operation to designate a particular sheet size in the size setting button of FIG. 7 may be an operation to make the crop print process effective. In this case, the particular sheet size may be a size of a sheet on which the printer 50 cannot perform the print process (e.g., A4 size, Letter size and the like).

According to the illustrative embodiment described above, the processes shown in FIG. 12-FIG. 15 are performed by the CPU 12. It is noted that a part of or all of the processes may be performed by an ASIC or other logical integrated circuits, or by cooperation of the CPU 12, ASIC and other logical integrated circuits.

What is claimed is:

1. A non-transitory computer-readable medium for an information processing apparatus having a communication interface and a controller,
 the non-transitory computer readable medium storing instructions realizing an image data arranging program, the image data arranging program causing, when executed, the controller to:
 receive first image data representing a first size image from a first image data providing program via an operating system, the operating system being installed in the information processing apparatus, the controller being configured to read the first image data providing program capable of outputting image data, the first image data being data indicating the first size image, the first size image including a plurality of object images arranged in a first arranged manner within a first size, the first size being one of A-series paper sizes and a letter size;
 analyze the first image data to extract a plurality of pieces of object data indicating the plurality of the object images included in the first size image, respectively;
 create second image data representing a second size image, the second size image including the plurality of the object images indicated by the extracted plurality of pieces of object data arranged in a second arranged manner within a second size, the second size being a label size different from the A-series paper sizes and the letter size, the second arranged manner being a manner different from the first arranged manner; and
 output the second image data to cause a printer to print the second image data.

2. The non-transitory computer-readable medium according to claim 1,
 wherein the first size is a size of a printing sheet on which a first number of the object images can be arranged in the first arranged manner, the first size image including a second number of the object images; and
 wherein the label size is a size of a cuttable tape-type sheet after the second number of the object images have been printed on a portion of the tape-type sheet and the portion has been cut out.

3. The non-transitory computer-readable medium according to claim 1, wherein the second image data is created such that each of the plurality of the object images is arranged and printed on one sheet of a printing sheet having the second size without being arranged over two or more of printing sheets having the second size.

4. The non-transitory computer-readable medium according to claim 1,
wherein at least one of the object images includes a barcode, and
wherein the image data arranging program causes the controller to detect an image area of the barcode included in the first image data, and extract the plurality of the object images from a particular area including the detected image area of the barcode.

5. The non-transitory computer-readable medium according to claim 1,
wherein the information processing apparatus has an operation receiving interface configured to receive user operations, and
wherein the image data arranging program causes the controller to:
output a first request for the first image data representing the first size image in response to the operation receiving interface receiving a first operation indicating printing the plurality of object images on a printing sheet having the first size; and
receive the image data representing the first size image from the first image data providing program in response to output of the first request for the first image data representing the first size image.

6. The non-transitory computer-readable medium according to claim 5,
wherein the image data arranging program causes the controller to:
output a second request for the second image data representing a second size image in response to the operation receiving interface receiving a second operation which is different from the first operation and indicates printing on a printing sheet having the second size;
in response to output the second request for the second image data representing the second size image, receive the second image data representing the second size image from the first image data providing program; and
transmit the second image data to cause the printer to print the second image data.

7. The non-transitory computer-readable medium according to claim 6,
wherein the image data arranging program causes the controller to output information indicating particular print setting information from among print setting information which can be input when the operation receiving interface receives the second operation to the first image data providing program in response to the operation receiving interface receiving the first operation.

8. The non-transitory computer-readable medium according to claim 6,
wherein the image data arranging program causes the controller to output information indicating output of image data of the second size image, which is output when the operation receiving interface receives the second operation is prohibited and output of image data of the first size image is allowed to the first image data providing program, in response to the operation receiving interface receiving the first operation.

9. The non-transitory computer-readable medium according to claim 5,
wherein the image data arranging program causes the controller to create the second image data in response to the operation receiving interface receiving an operation to designate the second size as a size of a printing sheet.

10. The non-transitory computer-readable medium according to claim 1,
wherein the image data arranging program causes the controller to create the second image data without changing the size of each of the plurality of the object images indicated by the extracted plurality of pieces of object data.

11. The non-transitory computer-readable medium according to claim 1,
wherein the information processing apparatus comprises a display interface,
wherein the first image data providing program causes the controller to display an image which is configured such that each of the plurality of the object images is included in the first size image on the display interface, and
wherein the image data arranging program causes the controller to display an image which is configured such that each of the plurality of the object images is included in a second size image on the display interface.

12. An information processing apparatus having a communication interface and a controller, the controller being configured to:
receive first image data representing a first size image, the first image data being data indicating the first size image including a plurality of object images arranged in a first arranged manner within a first size, the first size being one of A-series paper sizes and a letter size;
analyze the first image data to extract a plurality of pieces of object data indicating the plurality of object images included in the first size image, respectively;
create second image data representing a second size image, the second size image including the plurality of the object images indicated by the extracted plurality of pieces of object data arranged in a second arranged manner within a second size, the second size being a label size different from the A-series paper sizes and the letter size, the second arranged manner being a manner different from the first arranged manner; and
output the second image data to cause a printer to print the second image data.

* * * * *